United States Patent [19]

Looker

[11] Patent Number: 5,588,371

[45] Date of Patent: Dec. 31, 1996

[54] SKID FOR HEAVY PAYLOADS

[75] Inventor: Robert Looker, Carpenteria, Calif.

[73] Assignee: Satco, Inc., El Segundo, Calif.

[21] Appl. No.: 230,630

[22] Filed: Apr. 21, 1994

[51] Int. Cl.$^6$ .................................................. B65D 19/38
[52] U.S. Cl. ........................................................ 108/51.1
[58] Field of Search ........................... 108/51.1; 248/599, 248/600

[56] References Cited

U.S. PATENT DOCUMENTS

| 3,101,063 | 8/1963 | Wharton . | |
|---|---|---|---|
| 3,426,986 | 2/1969 | Pool | 108/51.1 |
| 3,523,507 | 8/1970 | Dubin . | |
| 3,734,524 | 5/1973 | Ciccarelli et al. . | |

FOREIGN PATENT DOCUMENTS

| 1589724 | 5/1970 | France . | |
|---|---|---|---|
| 4207727 | 9/1993 | Germany | 108/51.1 |
| 0081248 | 4/1983 | Japan | 108/51.1 |
| 5-278743 | 10/1993 | Japan | 108/51.1 |

Primary Examiner—Peter M. Cuomo
Assistant Examiner—Gerald A. Anderson
Attorney, Agent, or Firm—Lyon & Lyon

[57] ABSTRACT

A reusable skid for moving heavy bulk materials comprising a platform and a plurality of shock-absorbing skid feet. The platform, in its preferred embodiment, comprises a plurality of longitudinal and transverse beams forming an upper surface for mounting bulk materials. The preferred embodiment of the skid feet have leg members that are slidably mounted to the longitudinal beams. The skid feet also have elastomeric springs mounted between a spring base in the leg members that bias the longitudinal beams in an upward position at rest, and are compressed when bulk materials are placed on the skid, thereby cushioning the forces on the platform and the skid feet. The skid feet may easily be removed and replaced.

33 Claims, 3 Drawing Sheets

SKID FOR HEAVY PAYLOADS

FIELD OF INVENTION

This application relates to the field of material transportation, and particularly pallets or skids used to facilitate handling and transporting large or heavy payloads.

BACKGROUND

Transporting bulk quantities of heavy material from one location to another requires specialized equipment and packaging. Such bulk products include, among others, aluminum, brass, steel and plastic. These materials are often shipped in stacked flat sheets, bars or plates, or in large rolls. Bulk quantities of sheet aluminum, for example, are often shipped in large rolls that can be several feet wide, several feet high and weigh several thousands of pounds. These bulk materials, which are difficult to handle by themselves, must be packaged so that lifting equipment (such as a forklift) can have access to lift and transport the packaged payload quickly, easily, safely, and without damaging the payload material, as most bulk material packages will be handled several times between manufacture and end-use.

For example, after coming off of the manufacturing line in its final, ready-for-shipment form, the material is usually first moved to a staging or storage area. It is then typically moved to a shipping dock area, where is loaded onto a truck for shipment to the final destination, or to a long-haul carrier such as a train or plane. If to the latter, the packaged material will be handled several more times before reaching its end-use destination. Once there, the packaged material must be unloaded, placed in storage, and then moved yet again when actually used. Moreover, if not all of the material in one package is used at a single time, the package may be moved several more times to and from storage before all of the packaged material is used. Accordingly, it is not unusual for these heavy bulk payloads to be handled four, five, and even up to ten or more times before the material is completely used. Therefore, some means for allowing the packaged material to be easily moved must be provided.

The device most often used in the prior art for this purpose is the ubiquitous wooden pallet or skid, which consists of a wooden base to which are attached two or more wooden runners that extend the entire length of the base. The payload sits on the base and the runners provide space between the base and the ground (or other surface upon which the pallet or skid sits) so that the handling equipment, such as the tines of a forklift for example, can have access to get under the base to lift and move the packaged payload. These payloads are generally strapped to the pallet or skid using metal bands or other suitable means which are tightened prior to shipping. The pallet or skid and its strapped-on payload are then capable of being lifted and moved by overhead crane, fork lift trucks or other suitable device.

These wooden pallets are often custom-made to correspond to the exterior dimensions of the bulk material, and are made of rough-cut hardwood such as oak because of its beneficial combination of relative high strength, low weight and small cost, characteristics which are difficult to find in union. Any transportation pallet or skid must be strong to withstand the gross weight of the payload and the rigors associated with handling and transportation. Also, because almost all freight cost is based upon gross weight transported, the goal is always to add as little weight to the payload as possible. Therefore, low weight is also a design goal. Lastly, the preferred pallet or skid will cost as little to construct and maintain as possible.

As effective and efficient as these wooden pallets or skids have been, they do suffer from a number of deficiencies. First, with heavy bulk materials, the wooden devices are considered "one-way" shipping platforms because they are not reusable. Although oak is a "hard" wood and is therefore among the strongest and most durable woods available at a reasonable cost, the wooden devices and particularly the runners are subjected to substantial abuse during handling. Sometimes, the runners or base or both will be damaged by the handling equipment itself, as when the forklift driver miscalculates and runs the tines into the runners instead of the open space between them. Also, when the loaded pallet or skid is placed down, the forklift driver will often allow the load to descend at the maximum rate allowed by the equipment, and rarely is the driver concerned about whether the runners of the pallet or skid are perfectly parallel to the ground or truck bed. Therefore, one end or edge of one runner will hit the ground or truck bed first, with that one end or edge bearing all of the energy developed by the extremely heavy load descending at speed. Or the ground may be uneven such that one part of the runner will bear significantly more of the load impact. In either event, the runners tend to become rapidly damaged and disfigured, such that they cannot be reused. This not only raises the per-use cost of the wooden device, but also requires additional costs associated with storage of used pallets or skids pending dismantling and discard, and with the actual dismantling and discard. This is not only an unnecessary item of cost, but a nuisance as well.

Second, the wooden pallets or skids are subject to performance deficiencies. Because of the heavy loads which they must carry and the rigors of handling which they must endure, it is not unusual for them to become so damaged in transit that they must be repaired or replaced before reaching the end-user. This is particularly problematic because to replace the pallet or skid requires that the payload be removed from one and placed on another. The reason the pallet or skid was required in the first place, however, was because the payload itself was not easily moved, and not by the usual transportation means such as a standard forklift. Therefore, if the pallet or skid fails in transit, the payload itself must now be lifted and moved, often with tools ill-suited for the task. Not only is this difficult, time-consuming and inefficient, it can be dangerous, particularly if the appropriate equipment is not available in the field.

Third, the wooden devices are somewhat heavy and expensive, particularly when compared with the invention disclosed below. For example, a typical wooden pallet or skid made for a 5,000 pound payload of 4'×10' aluminum sheets requires approximately 56 board feet of lumber, and weighs about 215 pounds. The gross lumber costs are currently about $68, and are increasing as the cost of lumber has been steadily increasing. Assembly, dismantling and discard costs raise the per-use cost for a standard wooden pallet or skid to well over $100. As the wooden pallets or skids are often one-time-only use, that adds well over $100 to the net cost of each payload, which is passed along to the end-user, and ultimately to the end-user's customers, and so on.

Fourth, wooden pallets and skids use a natural resource—wood; and the used pallets and skids, or parts of them, may be burned or sent to landfill sites, adding to environmental pollution. Therefore, the use of wooden pallets and skids is not ecologically preferred.

Therefore, there exists a need for an improved skid or pallet for use with heavy bulk payloads that overcomes these problems associated with the prior art.

SUMMARY OF THE INVENTION

The present invention provides an improvement on the prior art wooden devices by using modern materials in a novel configuration that addresses the deficiencies of the previous wooden skids by making the skid lighter and reusable, and enhancing its performance and structural reliability. The preferred embodiment of the invention combines an aluminum platform for supporting the payload with a plurality of skid feet having integral elastomeric springs to harmlessly absorb the potentially damaging kinetic energy when the fully loaded skid is dropped on the ground, even if all of that force is focused on one end of one skid foot. This invention provides a skid that is stronger than the prior art wooden device, has a much longer useful life, capable of being reused hundreds of times (thereby lowering the per-use cost of the skid from well over $100 to about $2), and is about one-half the weight (thereby providing significant on-going savings of freight costs). Additionally, this novel design allows for easy repair of that part of any skid most often damaged—the skid feet or "runners"—and even when eventually damaged beyond repair, the materials used in this invention are completely recyclable.

The preferred embodiment of the present invention may be used in "closed" shipping systems such as a producing sheet mill making multiple shipments to its distributors where the skid is returned to the sender after use, to be used again. A typical skid of the present invention made for a 5,000 pound shipment of aluminum 4'×10' sheets weighs about 105 pounds, costs approximately $220.00, and is capable of making hundreds of round trips without substantial maintenance incident.

Accordingly, it is an object of the present invention to provide an improved pallet or skid for handling and moving heavy, bulk quantities of material.

These and other objects of the present invention will become better understood through a consideration of the following description taken in conjunction with the drawings.

DETAILED DESCRIPTION

Figure 1A:
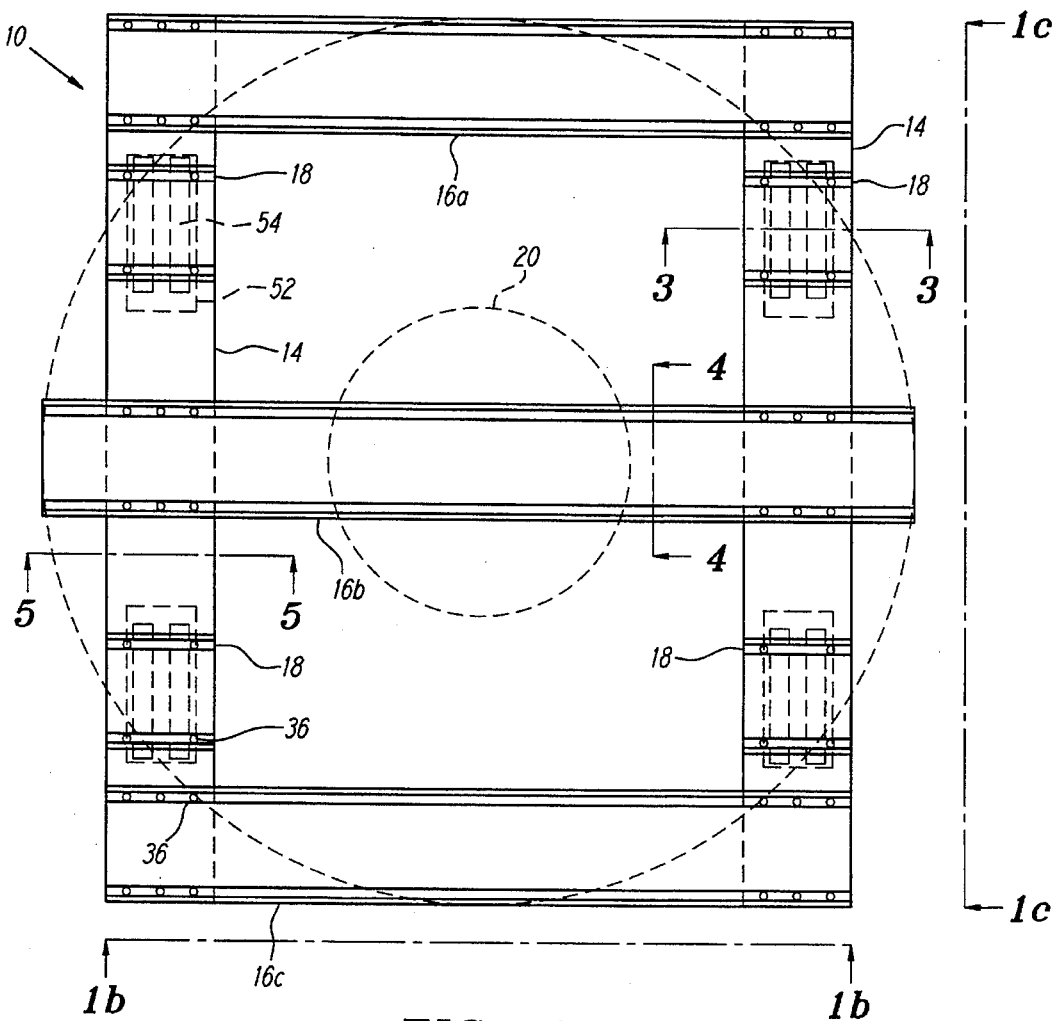
FIG. 1A is a top view of an embodiment of the skid having two longitudinal beams, three transverse beams, and four short beams, and in phantom showing four sets of elastomeric springs, the spring base and a payload footprint.
Figure 1B:
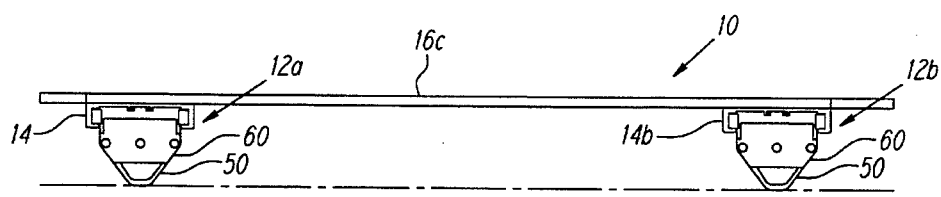
FIG. 1B is a front view of the embodiment of FIG. 1A, taken along line B—B, showing the placement of skid feet with respect to multiple longitudinal beams and a transverse beam, and also showing the end cap over the skid foot assembly.
Figure 1C:
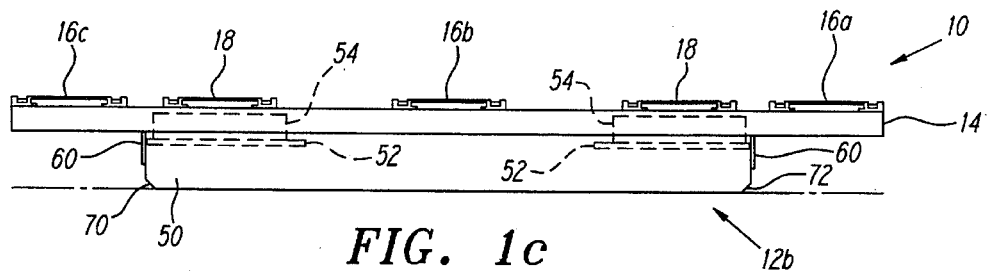
FIG. 1C, is a side view of the preferred embodiment of FIG. 1A, taken along line C—C, showing the placement of a skid foot with respect to multiple transverse beams and a longitudinal beam and in phantom showing two elastomeric springs and spring base plates.
Figure 2A:
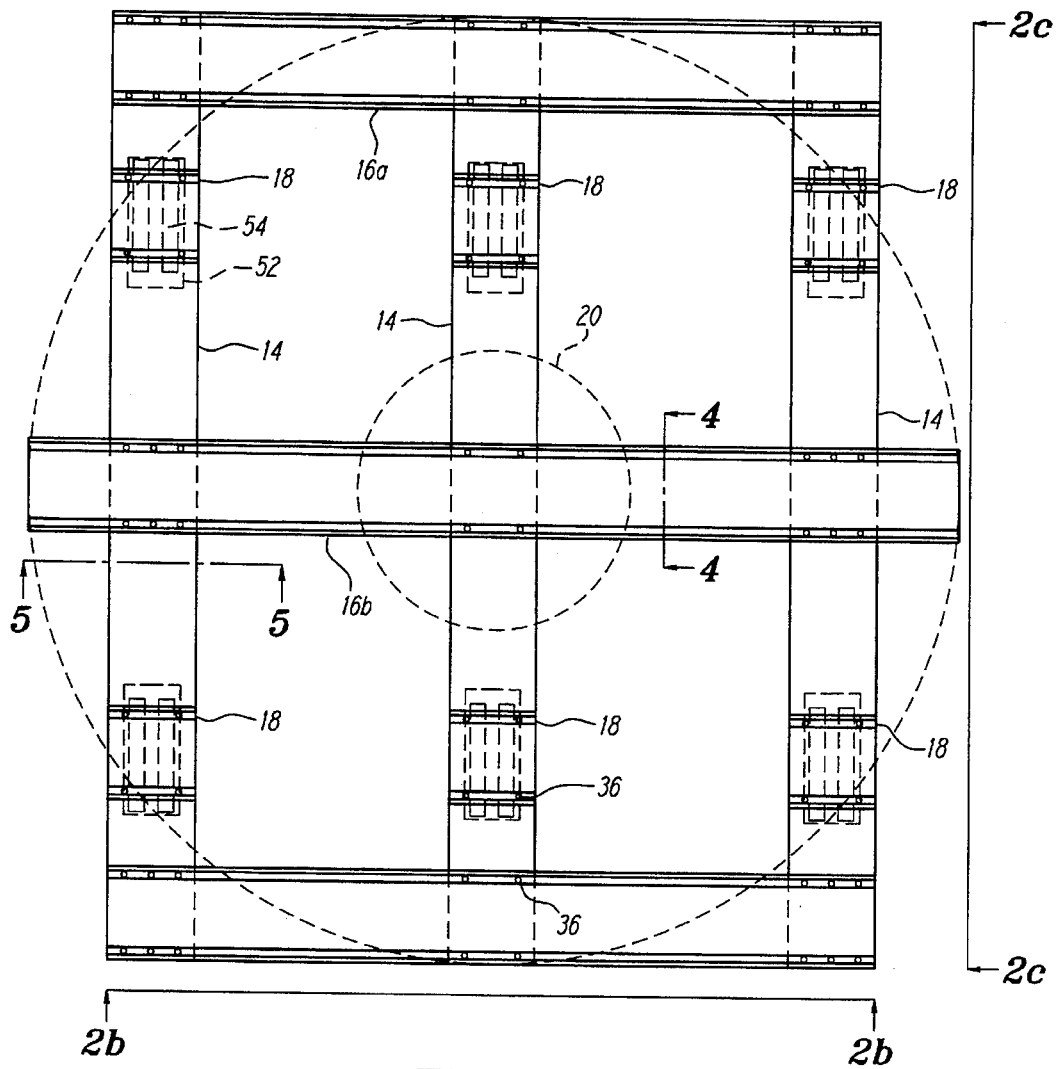
FIG. 2A is a top view of an embodiment of the skid intended for even heavier loads requiring more structural support, this embodiment having three longitudinal beams, three traverse beams and six short beams, and in phantom showing six sets of elastomeric springs and a payload footprint.
Figure 2B:
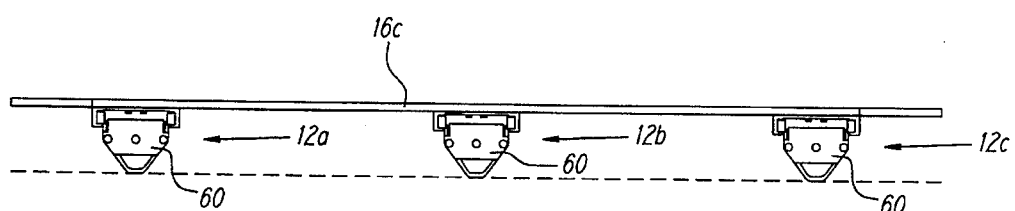
FIG. 2B is a front view of the embodiment of FIG. 2A, taken along line B—B, showing the placement of skid feet with respect to multiple longitudinal beams and a transverse beam.
Figure 2C:
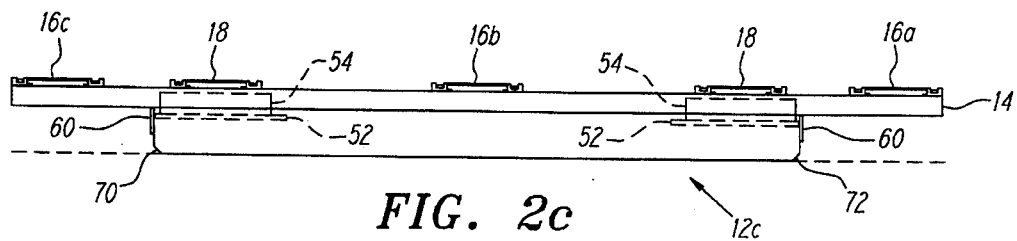
FIG. 2C is a side view of the embodiment of FIG. 2A, taken along line C—C, showing the placement of a skid foot with respect to multiple transverse beams and short beams, and a longitudinal beam, and in phantom showing two elastomeric springs and spring base plates.

Turning now to the drawings, FIGS. 1A, 1B, and 1C depict different views of a preferred embodiment of the present invention which will be used for most payloads, while FIGS. 2A, 2B and 2C show another embodiment intended for use with extremely heavy payloads.

The preferred skid generally comprises a platform 10 and a plurality of skid feet assemblies 12 (e.g., two skid feet 12a and 12b are shown in FIG. 1, and three skid feet 12a, 12b and 12c are shown in FIG. 2). The platform is preferably constructed using a plurality of beams, including longitudinal beams 14, transverse beams 16, and short beams 18. Because of the desire to decrease the gross weight of the skid to the extent possible, a platform constructed of individual cross-members is preferred, since it will provide the required strength at the least weight. Certainly, however, the platform 10 could be of other design, such as a single-piece construction.

The preferred embodiment for the platform 10 shown in FIG. 1 comprises two longitudinal beams 14, three transverse beams 16, and four short beams 18. Reference herein to "longitudinal" as in a direction shall mean parallel to the longitudinal beams 14, and reference to "transverse" as in a direction shall mean parallel to the transverse beams 16. The transverse beams 16 and the short beams 18 are fixedly attached on an upper surface of the longitudinal beams 14 by means well known in the art, such as rivets or bolts. The two outside transverse beams 16a and 16c are at their distal ends attached perpendicularly to the ends of longitudinal beams 14 thereby forming a substantially rectangular shape, and are sized to precisely fit one exterior dimension of the payload footprint 20 (depicted here as the end of a roll of aluminum sheet material).

The third or center transverse beam 16b is attached substantially perpendicularly to and generally in the middle of the two longitudinal beams 14 and extends beyond the longitudinal beams 14 to a distance that mates with the other dimension of the payload footprint 20 so that the platform 10 provides both longitudinal and transverse support for the payload. Because the footprint of this particular payload is circular, sufficient stability can be obtained on the skid by the design shown, in which only the middle transverse beam 16b is as long as the diameter of the payload footprint 20, thus saving material costs in the length of transverse beams 16a and 16c.

Figure 4:
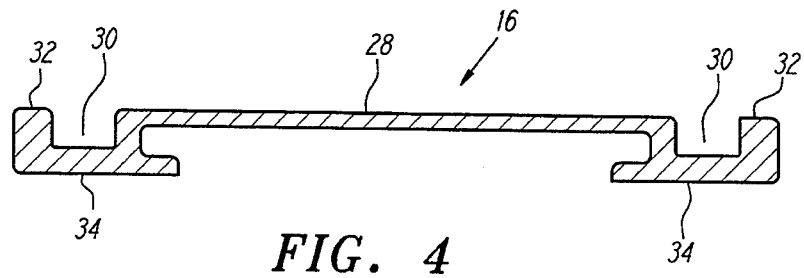
FIG. 4 is a detailed cross-sectional view of a preferred embodiment of a transverse beam taken along line 4—4 of FIGS. 1A and 2A. The short beams have the same cross-sectional design.

The short beams 18 have a cross-section substantially identical to the transverse beams 16, as shown in FIGS. 1C, 2C and 4, and are generally located directly above the attachment points for each skid foot assembly 12, as shown by phantom lines in FIGS. 1A and 2A. The short beams 18 thus play the dual roll of first providing two-ply strength at the attachment points between the platform and the skid feet assemblies, and second, proving additional platform support for the payload. As is seen in FIG. 1A and 2A, the payload will rest on the transverse beams 16 and the short beams 18.

The cross-sectional design of transverse beams 16 and short beams 18 (as illustrated in FIG. 4) is intended to maximize strength and durability while minimizing weight and cost. These beams comprise an upper flat surface 28, a pair of channels 30, a pair of ribs 32, and a pair of base feet 34. These beams are attached on top of the longitudinal beams 14 such that the feet 34 come into contact with the beams 14, while the upper surface 28 and the ribs 32 are presented to the payload 20. The ribs 32 therefore provide a type of "knurled" surface, increasing surface friction with the underside of the payload 20, so as to prevent slippage. The channels 30 provide a recessed area within which the head of the rivet or bolt 36 (not shown in FIG. 4, but see FIG. 3) or other attachment means can reside, protected from damage from the payload 20.

The traverse beams 16 and short beams 18 are preferably constructed of a continuous piece of extruded aluminum, such as alloy #6351 or #6061-T6, but can be of other alloy or other suitable material that provides sufficient strength for the intended payload 20.

Figure 3:
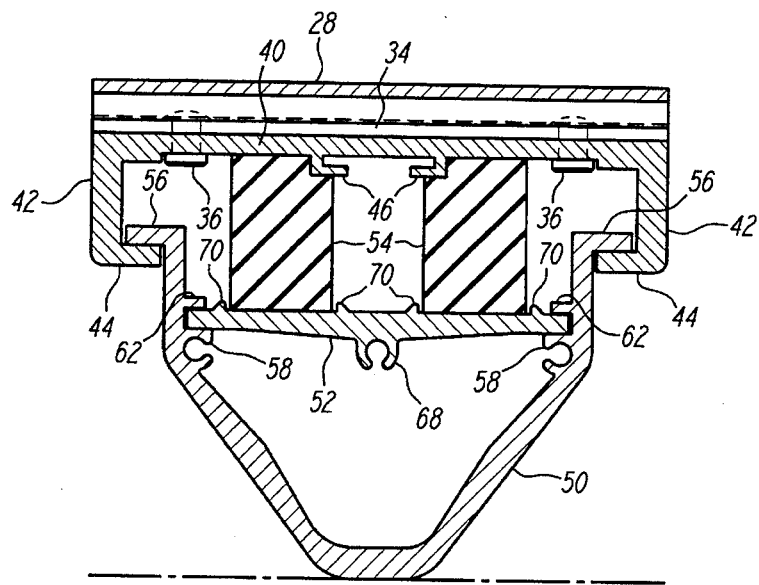
FIG. 3 is a detailed cross-sectional view of a preferred embodiment of a skid foot assembly taken along line 3—3 of FIGS. 1A and 2A in which the foot member is movably attached to the longitudinal beam, and the set of elastomeric springs situated between the base plate and the beam to absorb the energy and shock when the foot member hits the ground.
Figure 5:
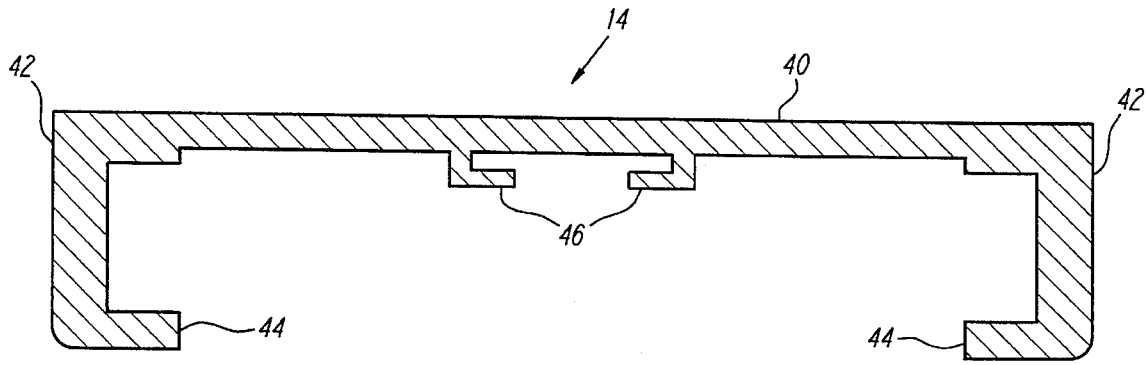
FIG. 5 is a cross-sectional view of the preferred embodiment of a longitudinal beam which provides the dual purpose of being used in constructing the platform and also used as the housing in the skid foot assembly.

The preferred cross-sectional design of each longitudinal beam 14 is illustrated in isolation in FIG. 5, and in conjunction with other components of the skid feet assembly 12 in FIG. 3. The preferred design is substantially C-shaped, in which there is a flat base section 40 which extends the entire width and length of the beam, and a pair of downwardly-extending, opposed L-shaped arms 42, each having an inwardly-extending flange piece 44 at the end thereof. The purpose of the arms 42 and flange pieces 44, as will be explained in greater detail infra, is to provide the dual function of strengthening the beams 14 to support the weight of the payload 20 without flexing and to present a housing for the skid feet assembly 12. The base section 40 has another, smaller pair of downwardly-extending, opposing flanges 46 near its centerpoint. These provide a channel through which metal strapping material may be routed to secure the payload 20 to the skid.

These beams 14 must be sufficiently rigid to avoid flexing under the weight of the payload, and are therefore preferably constructed of an aluminum alloy extrusion having high tensile strength properties, yet not being brittle or subject to cracking when dented. One material found to be suitable is aluminum alloy #6061-T6. The overall dimensions will of course depend upon the weight and size of the intended payload.

The skid feet assemblies 12 are constructed so that the static and kinetic energy imparted by a payload 20 is absorbed and does not materially damage the skid. Preferably, each skid foot assembly 12 comprises a leg member 50 that is substantially V-shaped in cross-section and runs the entire length of the assembly, two horizontal spring bases 52, and two pairs of elastomeric springs 54, one pair located at either end of the foot assembly. The upper portions of leg members 50 have outwardly extending shoulders 56, and the exterior dimensions of the leg members 50 and the shoulders 56 flushly mate with the interior dimensions of the flange pieces 44 on the longitudinal beams 14. Interiorly, the V-shaped leg members 50 have a pair of reinforcement beads 58 that are added to the points of curvature on the "V" of the leg member 50 so as to strengthen them and prevent against their collapse or deformation when subjected to potentially crushing force. The reinforcement beads 58 run the entire length of the leg member 50, and are preferably formed in the shape of a flattened "C," as that shape provides sufficient reinforcement while using less material than a solid bead. This design also provides a flat upper surface which is used as a bottom support surface for the spring base plate 52, and this design lastly presents an open core that can be used as a "pre-drilled" hole to attach the end cap 60 to the foot assembly 12. The leg member 50 also has on each interior side a small interiorly-extending flange 62 that acts as the upper retainer for the spring base plate 52.

Each foot assembly also preferably includes two sets of spring base plates 52, each supporting a pair of elastomeric springs 54, shown in dashed lines in FIGS. 1A and C and 2A and C. Each spring base plate 52 is frictionally mounted in the longitudinal channel that is formed on each interior side of the V-shaped leg member 50 by reinforcement beads 58 and the flanges 62. The spring base plate include a center C-shaped reinforcement bead 68 that in addition to strengthening the base, also provides a pre-drilled hole for attachment of the end cap 60, Individual springs 54 are mounted on an upper surface of the base plates 52, held in position on the bottom by a plurality of ribs 70 running the longitudinal length of the base plate 52, and on the top by the small flanges 46, as the top corner of the springs 54 are grooved to mate with the flanges 46.

As is shown in FIG. 3, each leg member 50 has a shoulder 56 that fits between the flange 44 on each longitudinal beam 14, which are relationally sized so that the leg member 50 may travel vertically, but not horizontally, within the space created between the flanges 44 and the underside of flat base 40, somewhat like a piston within a piston chamber. When there is no payload on the skid, the springs 54 bias the leg members 50 to a position where the shoulders 56 are in contact with the flanges 44.

When a payload is mounted on the skid and the skid is dropped onto a surface, this imparts a downward force on the transverse beams 16 and the short beams 18, which is in turn transferred to the longitudinal beams 14, resulting in a compression of the springs 54. When the springs 54 are compressed, the longitudinal beams 14 move downward relative to the leg members 50. The kinetic force is the greatest at initial impact when the load is first placed on the skid or when the skid and payload are dropped or placed on the ground or other surface. Initially, the springs 54 will compress to a greater extent and then equalize when there are only static forces acting on them, acting in much the same way as a shock absorber. It has been found that only two sets of springs 54 are needed for each foot assembly 12. It would be possible, however, to substitute several smaller foot assemblies for the one long assembly shown on each longitudinal beam 14, and for each assembly to include a pair of springs. That embodiment would be preferred if providing both longitudinal and transverse access for the handling equipment was a design goal.

The preferred material for the springs 54 is a bar-type elastomeric material (60 shore neoprene) that is substantially rectangular in cross-section. This material in this shape is preferred because of its excellent shock absorption characteristics, its light weight, it durability, its low cost, and its ease of handling during construction and repair of the foot assemblies. Any other suitable material, for example metal or plastic coils, or hydraulic or air compression assemblies, among others, could be substituted for the elastomeric bar stock shown.

The platform 10 and the skid feet assemblies 12 are designed so that the skid feet can be easily repaired in the event that they are damaged, so that the entire unit need not be discarded. Assembly and repair is quite simple. To assemble, after the longitudinal, transverse and short beams (14, 16 and 18) are attached together by conventional rivet or bolt means, the open-ended leg member 50 is slid into position in longitudinal beam 14, the springs 54 are put into position and the base plates 52 are then slid into the channel from either end of the leg member 50, and end cap 60 screwed onto the end of the foot assembly. The end cap 60 keeps the internal assembly in place and prevents damage from outside forces such as inadvertent striking by the forklift tines. Repair is accomplished by reversing those steps.

It is preferable that the skid feet assemblies 12 are sufficiently long to extend farther than the payload, as indicated by dashed lines in FIG. 1A, so that the equipment operator is able to see them to prevent damage from the material handling equipment. Additionally, the skid feet assemblies 12 must provide enough clearance for the forklift tines or other equipment. Also, the skid feet 12 preferably have angled ends 70 and 72 to allow for sliding in a longitudinal direction over uneven floors. Preferably, the skid feet 12 need to be robust enough to withstand the rigors of use, yet no more substantial than the beams to which they are attached, for, if and when a skid foot is struck by a forklift tine, it is preferable for the leg member 50 suffer damage rather than to transfer the forces from the blow to any of the beams.

While embodiments of the present invention have been shown and described, various modifications may be made without departing from the scope of the present invention, and all such modifications and equivalents are intended to be covered.

I claim:

1. A skid for transporting a payload, the skid comprising:
   a skid platform;
   a plurality of feet on the platform, each foot including:
      an upper section attached to the platform;
      a lower section secured to the upper section;
      a shock absorber extending between the upper section and the lower section;
      an interior plate in the lower section supporting the shock absorber; and
      means for substantially restricting horizontal movement of the upper section relative to the lower section.

2. A skid for transporting a payload, the skid comprising:
   a skid platform including a plurality of longitudinal beams and transverse beams;
   a plurality of feet on the longitudinal beams, each foot including:
      a leg member having an upper leg section contained within the longitudinal beam and a lower leg section attached to the upper leg section;
      a shock absorber extending between the longitudinal beam and the leg member and tending to urge the leg member away from the longitudinal beam; and
      means for substantially restricting horizontal movement of the leg member relating to the longitudinal beam.

3. The skid of claim 2 in which said longitudinal beams and said transverse beams are perpendicular to one another.

4. The skid of claim 3 wherein said beams are attached to each other with fasteners.

5. The skid of claim 4 in which said traverse beams have a recessed area with the fasteners positioned in the recessed area.

6. The skid of claim 2 further comprising flanges in the upper section for securing the shock absorber.

7. The skid of claim 2 in which said feet are attached to said transverse beams.

8. The skid of claim 2 in which said lower section is substantially V-shaped in cross-section.

9. The skid of claim 8 in which the upper leg section of said V-shaped leg member comprises two outwardly extending shoulders.

10. The skid of claim 2 wherein said traverse beams have a knurled upper surface.

11. The skid of claim 2 wherein the means for substantially restricting comprises L-shaped arms on the longitudinal beams and shoulders on the leg member, positioned within the arms.

12. The skid of claim 2 in which said beams are made of extruded aluminum alloy.

13. The skid of claim 2 in which said shock-absorbing material comprises an elastomer.

14. The skid of claim 13 in which said elastomer is in the shape of a bar having a rectangular cross-section.

15. The skid of claim 14 in which said elastomer is 60 shore neoprene.

16. The skid of claim 2 in which said shock absorber comprises one or more pairs of elongate neoprene bars, each having a substantially rectangular cross-section.

17. The skid of claim 2 in which there are two skid feet, symmetrically arranged on said platform.

18. The skid of claim 2 in which the skid feet extend substantially the entire length of the platform.

19. The skid of claim 2 in which said skid feet are placed at irregularly spaced intervals on said platform.

20. The skid of claim 2 in which said skid feet are placed at regularly spaced intervals on said platform.

21. A skid for use in transporting bulk materials comprising
   a platform having a plurality of longitudinal beams attached to a plurality of transverse beams and a plurality of short beams, said transverse beams and short beams forming an upper surface for loading bulk materials, and
   a plurality of skid feet slidably mounted to a lower surface of said longitudinal beams, whereby each skid foot comprises a leg member having two shoulders which are movable within said longitudinal beam, a horizontal spring base plate attached to said leg member, and a plurality of elastomeric springs positioned between said spring base plate and said longitudinal beam.

22. The skid of claim 21 wherein said transverse beams comprise an upper surface, a plurality of vertical supports, a plurality of bases, and a plurality of ribs.

23. The skid of claim 22 wherein said transverse beams and said short beams have a plurality of ribs providing a knurled surface.

24. A skid for transporting a payload, the skid comprising:
   a platform having a plurality of transverse beams attached to a generally flat upper surface on longitudinal beams, with the longitudinal beams also having two facing, substantially L-shaped arms extending from the generally flat upper surface, with each of the arms having an inwardly-extending flange piece; and a plurality of skid feet on said platform, each skid foot comprising a leg member having an upper portion including outwardly extending shoulders retained by the flange piece on each arm and a shock absorber extending between said leg member and said platform.

25. The skid of claim 24 further comprising a base plate extending across the leg member adjacent to the inwardly extending flange pieces.

26. A skid for transporting a payload comprising:
   a) a platform including a plurality of transverse beams attached to a generally flat upper surface of a plurality of longitudinal beams;
   b) a plurality of skid feet supporting said platform, each skid foot comprising a leg member having a first end with two outwardly extending shoulders secured to said platform, and a second end which comes into contact with the ground having a substantially V-shaped cross-section;
   c) said longitudinal beams having two facing, substantially L-shaped flanges with said outwardly-extending shoulders of said first end movably secured within said flanges;
   d) an interior plate on the leg member; and
   e) a shock absorbing material between the interior plate and the longitudinal beams.

27. The skid of claim 26 in which said shock-absorbing material comprises an elastomer.

28. The skid of claim 27 in which said elastomer is in the shape of an elongate bar having a rectangular cross-section.

29. The skid of claim 28 in which said elastomer is 60 shore neoprene.

30. The skid of claim 26 in which there are two skid feet, symmetrically attached one each to opposing longitudinal beams.

31. The skid of claim 30 in which said skid feet extend substantially the entire length of said longitudinal beams.

32. The skid of claim 31 in which each skid foot includes two pairs of elastomeric material.

33. The skid of claim 26 in which each longitudinal beam has a plurality of individual skid feet, each foot having elastomeric material.

* * * * *